United States Patent
Chan et al.

(10) Patent No.: US 7,158,336 B2
(45) Date of Patent: Jan. 2, 2007

(54) WINDOW TIMING ADJUSTMENT FOR SPIRAL BURSTS

(75) Inventors: Kwong-Tat Chan, Pleasanton, CA (US); Tom Chan, San Marino, CA (US); Bipinchandra V. Gami, Northridge, CA (US); Tung Nguyen, San Jose, CA (US); Yih Hurng Jung, Santa Clara, CA (US)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 11/049,790

(22) Filed: Feb. 2, 2005

(65) Prior Publication Data

US 2006/0171059 A1 Aug. 3, 2006

(51) Int. Cl.
*G11B 5/596* (2006.01)

(52) U.S. Cl. .................................... 360/77.05

(58) Field of Classification Search ............ None
See application file for complete search history.

(56) References Cited

U.S. PATENT DOCUMENTS 6,985,316 B1 * 1/2006 Liikanen et al. ............ 360/29

* cited by examiner

*Primary Examiner*—Hoa T. Nguyen
*Assistant Examiner*—Mitchell Slavitt
(74) *Attorney, Agent, or Firm*—Benj. J. Yorks; Irell & Manella LLP

(57) ABSTRACT

A method for writing servo information onto a disk of a hard disk drive with a servo writer. The method includes writing a plurality of spiral servo signals with a head. The spiral servo signals are used to write servo patterns using at least one timing window. The timing window is adjusted using a position error signal generated from the spiral servo signals. The adjusted timing window is then used to write servo patterns onto the disk. Adjusting the timing window compensates for irregularities in the spiral servo signals.

14 Claims, 7 Drawing Sheets

WINDOW TIMING ADJUSTMENT FOR SPIRAL BURSTS

BACKGROUND OF THE INVENTION

1. Field of the Invention

The present invention relates to a method for writing servo onto disks of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided into a number of segments or sectors. The voice coil motor and actuator arm can move the heads to different tracks of the disks.

FIG. 1 shows a typical track that has a number of fields associated with each sector. A sector may include an automatic gain control ("AGC") field 1 that is used to adjust the strength of the read signal, a sync field 2 to establish a timing reference for the circuits of the drive, and ID 3 and Gray Code 4 fields to provide sector and track identification.

Each sector may have also a servo field 5 located adjacent to a data field 6. The servo field 5 contains a plurality of servo bits A, B, C and D that are read and used to position the head 7 relative to the track.

The fields 1–5 must be written onto the disk surfaces during the manufacturing process of the disk drive. These fields are typically written with a servo writer. The servo tracks are sometimes written using a number of spiral servo tracks initially written onto the disks. FIG. 2 shows an example of a number of spiral servo tracks written onto a disk. Using spiral servo tracks is sometimes referred to as an Ammonite servo write process. The spiral servo tracks are used to write the final radial servo tracks that are utilized during the normal operation of the disk drive. This process is described in U.S. Pat. No. 5,668,679 issued to Swearingen et al.

As shown in FIG. 3, the disk has a plurality of spiral servo patterns incrementally spaced across the surface of the disk. To write servo the servo writer reads the disk to detect a spiral servo signal. The servo writer uses the detected spiral servo signal to time the writing of a permanent A, B, C and D servo burst pattern.

As shown in FIG. 4, the reading process to sense the spiral servo signal occurs during a "timing window" that is periodically opened by the servo writer. Timing imperfections or thermal instability may create a non-uniform pattern of spiral servo signals. As shown in FIG. 5, the non-uniformity may cause the timing window to miss the spiral servo signal during the A, B, C and D servo bit writing process. It would be desirable to adjust the timing window to compensate for irregularities in the spiral servo signals.

BRIEF SUMMARY OF THE INVENTION

A method for writing servo onto a disk of a hard disk drive. The method includes writing a plurality of spiral servo signals with a head. The spiral servo signals are to be used to write servo patterns using at least one timing window. The timing window is adjusted using a position error signal generated from the spiral servo patterns. The adjusted timing window is then used to write servo patterns onto the disk.

DETAILED DESCRIPTION

Disclosed is a method for writing servo information onto a disk of a hard disk drive with a servo writer. The method includes writing a plurality of spiral servo signals with a head. The spiral servo signals are used to write servo patterns using at least one timing window. The timing window is adjusted using a position error signal generated from the spiral servo signals. The adjusted timing window is then used to write servo patterns onto the disk. Adjusting the timing window compensates for irregularities in the spiral servo signals.

Figure 6:
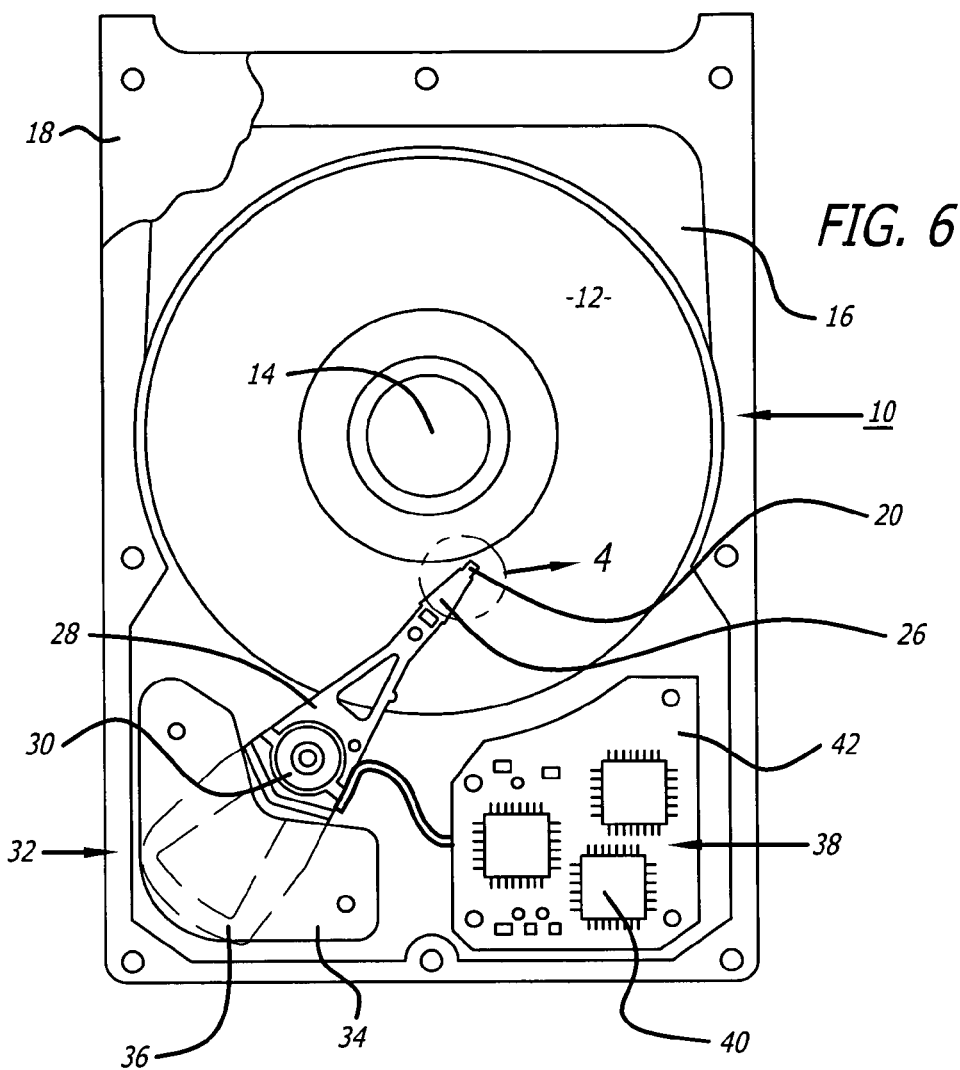
FIG. 6 is a top view of an embodiment of a hard disk drive.

Referring to the drawings more particularly by reference numbers, FIG. 6 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 7:
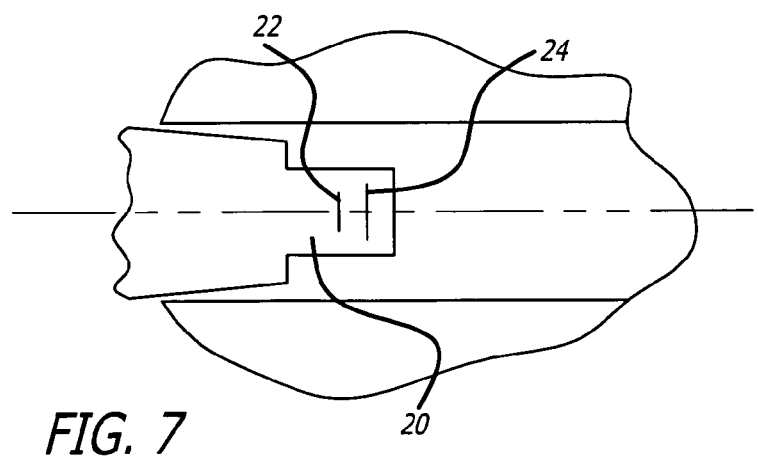
FIG. 7 is a top enlarged view of a head of the hard disk drive.

The disk drive 10 may include a plurality of heads 20 located adjacent to the disks 12. As shown in FIG. 7 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux.

Referring to FIG. 6, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 8:
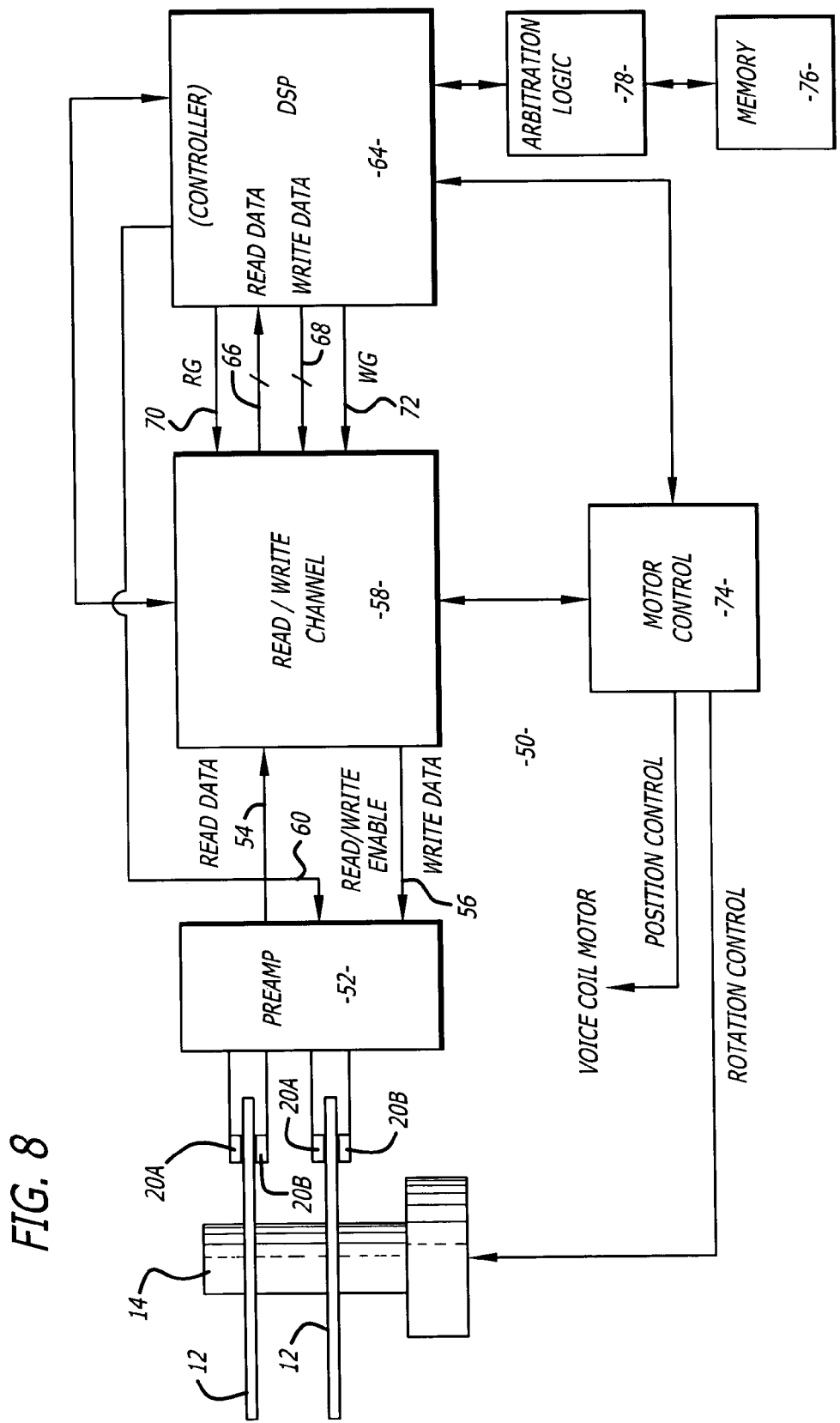
FIG. 8 is a schematic of an electrical circuit for the hard disk drive.

FIG. 8 shows an electrical circuit 50 for reading and writing data onto the disks 12. The circuit 50 may include a pre-amplifier circuit 52 that is coupled to the heads 20. Each disk 12 may included a first head 20A and a second head 20B. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 62 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM") that contains instructions that are read by the controller 64. The memory 76 may be coupled to the controller 64 by arbitration logic 78.

Figure 9:
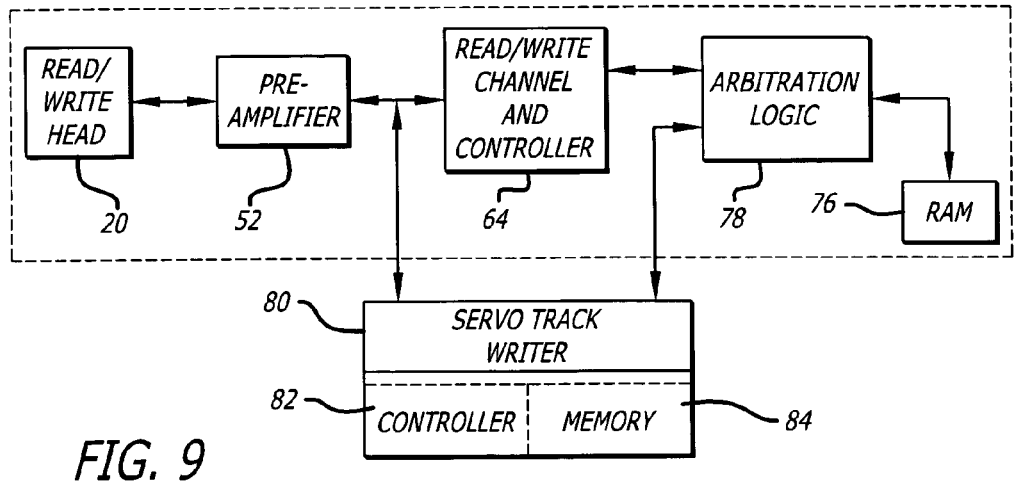
FIG. 9 is a schematic showing a servo writer connected to the hard disk drive.

During the manufacturing process of the disk drive 10 servo information must be written onto the disks 12. This is typically done with a servo track writer 80. FIG. 9 shows a servo track writer 80 connected to a hard disk drive 10. The servo track writer 80 may include a controller 82, memory 84 and other circuitry for writing servo information onto the disk(s) of the disk drive. The servo writer 80 may utilize the pre-amplifier, read/write channel, etc. of the disk drive to both write servo information. The servo writer 80 may also employ the circuits of the disk drive to read servo information and position a head onto a track of the disk(s).

Figure 1:
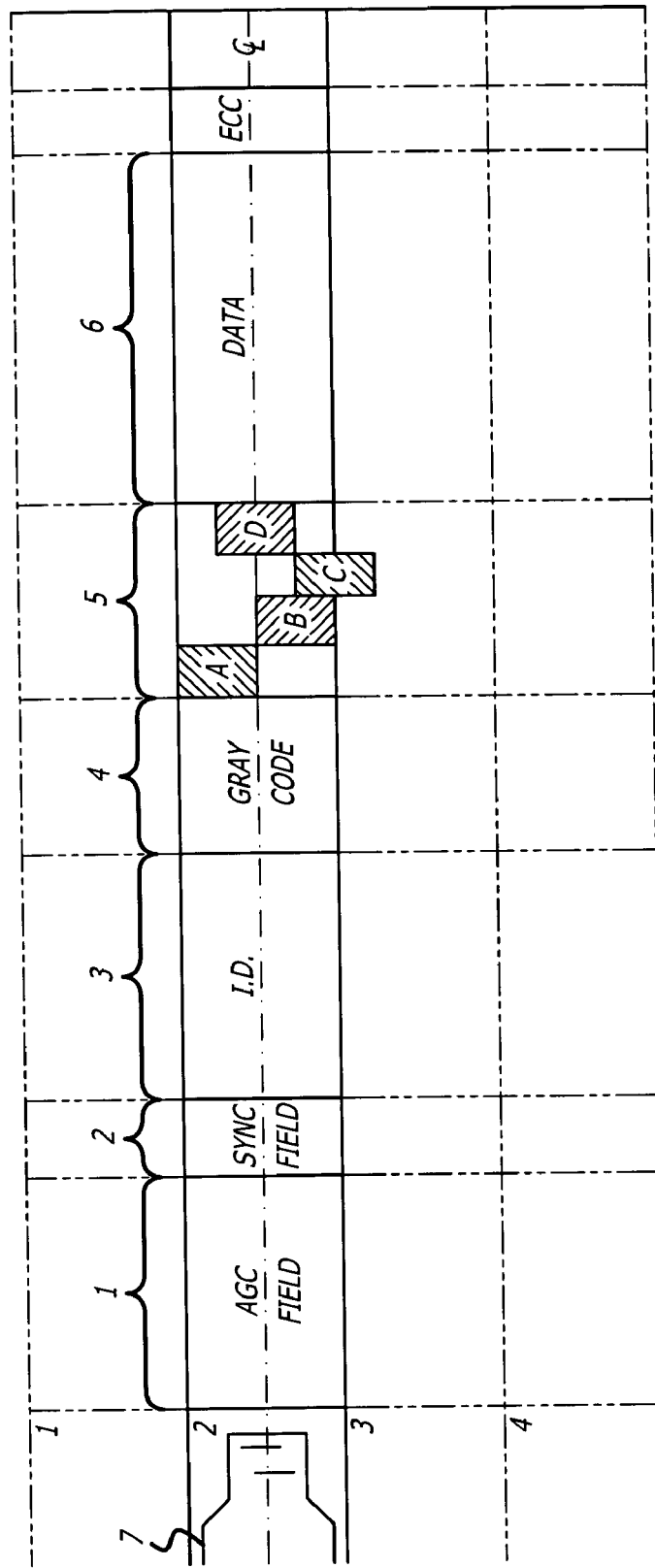
FIG. 1 is an illustration of a track of the prior art.
Figure 2:
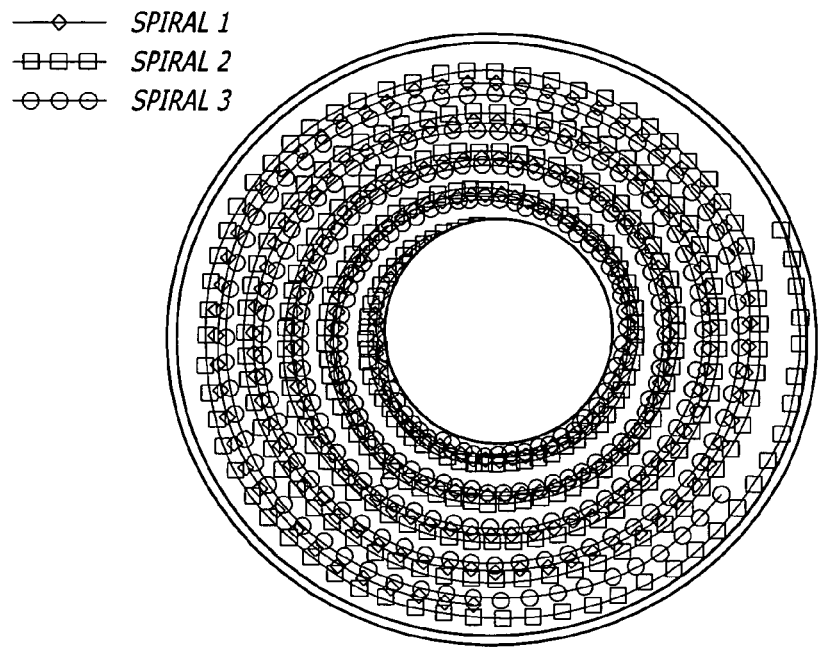
FIG. 2 is an illustration showing a plurality of spiral servo tracks written onto a disk in the prior art.
Figure 3:
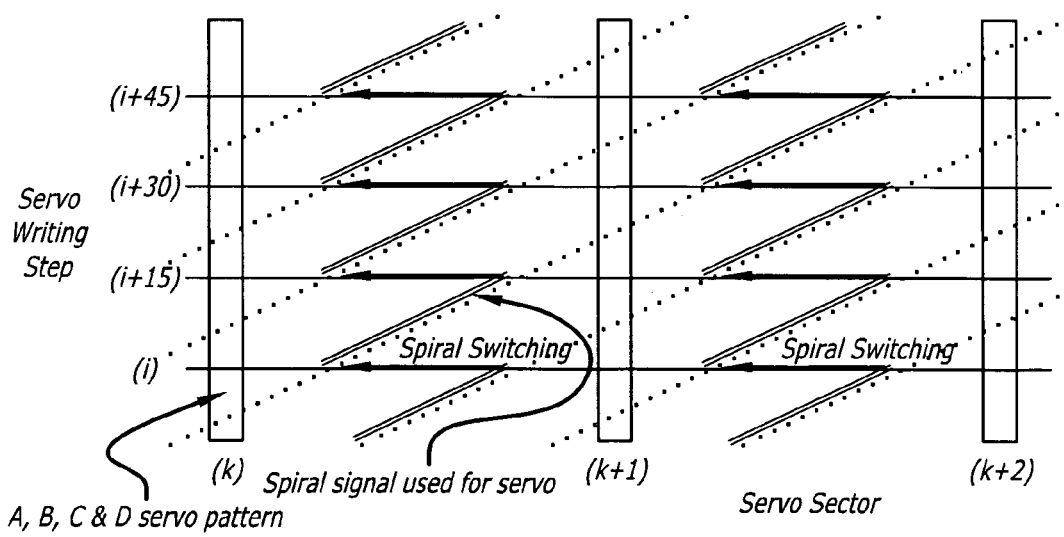
FIG. 3 is an illustration showing a plurality of spiral servo patterns used to write A, B, C and D servo bit patterns.
Figure 4:
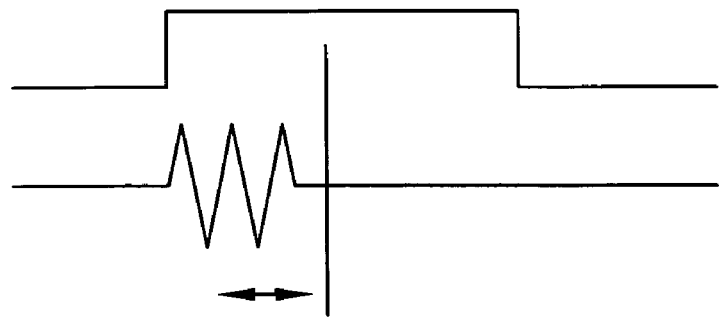
FIG. 4 is an illustration showing a timing window detecting a spiral servo burst.
Figure 5:
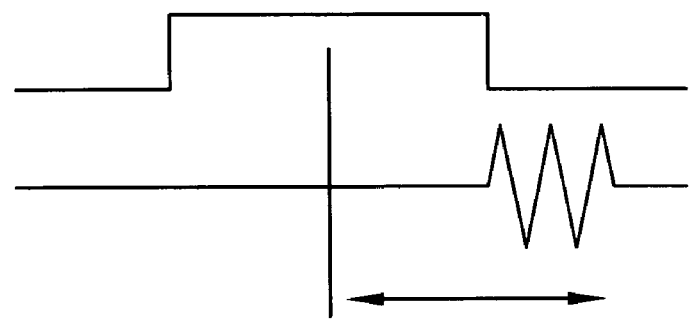
FIG. 5 is an illustration showing a timing window missing a spiral servo burst.
Figure 10:
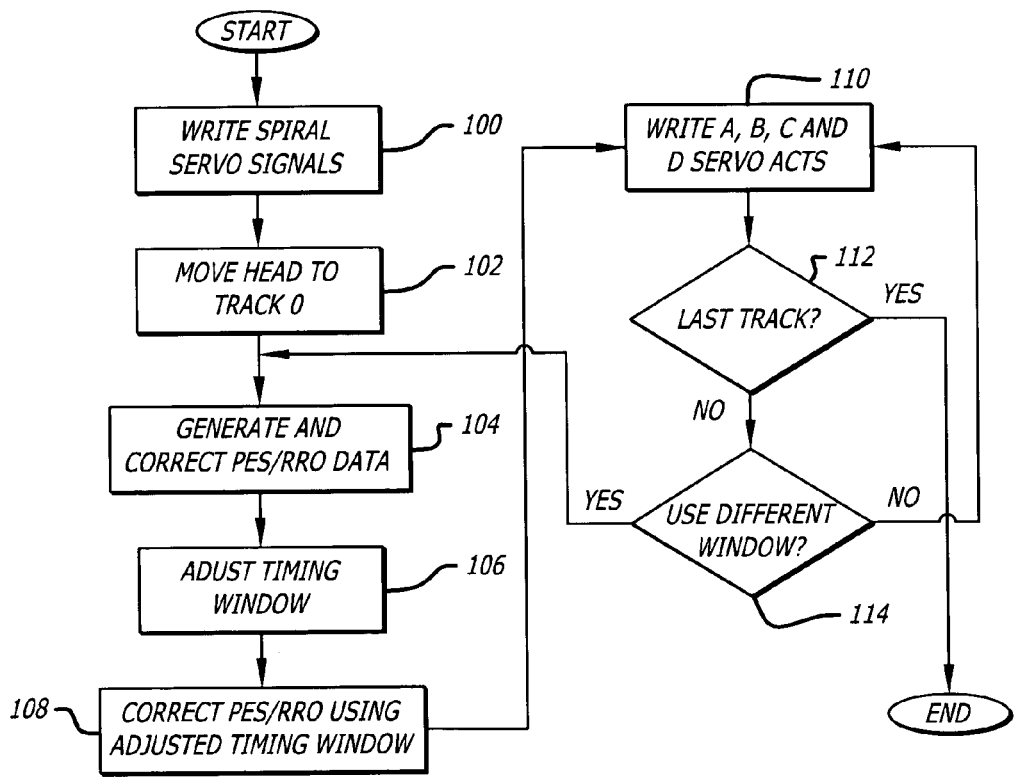
FIG. 10 is a flowchart describing a process to write a servo pattern onto a disk of the drive.

FIG. 10 is a flowchart describing the writing of servo patterns onto the disk(s) with the servo track writer. In block 100 the servo writer causes the disk drive to write a plurality of spiral servo signals such as the pattern shown in FIGS. 2 and 3. The writing of spiral servo signals may the same or similar to the process described in U.S. Pat. No. 5,668,679 issued to Swearingen et al., which is hereby incorporated by reference.

In block 102 the servo writer causes the head to move to track 0. In block 104 the servo writer can read the spiral servo signals and to generate and correct a position error signal ("PES"). The PES may actually be an average PES value calculated from a number of PES values generated during one revolution of the disk. The generation of the PES signal can be the same or similar to a process described in U.S. Pat. No. 6,049,440 issued to Shu, which is hereby incorporated by reference.

Figure 11:
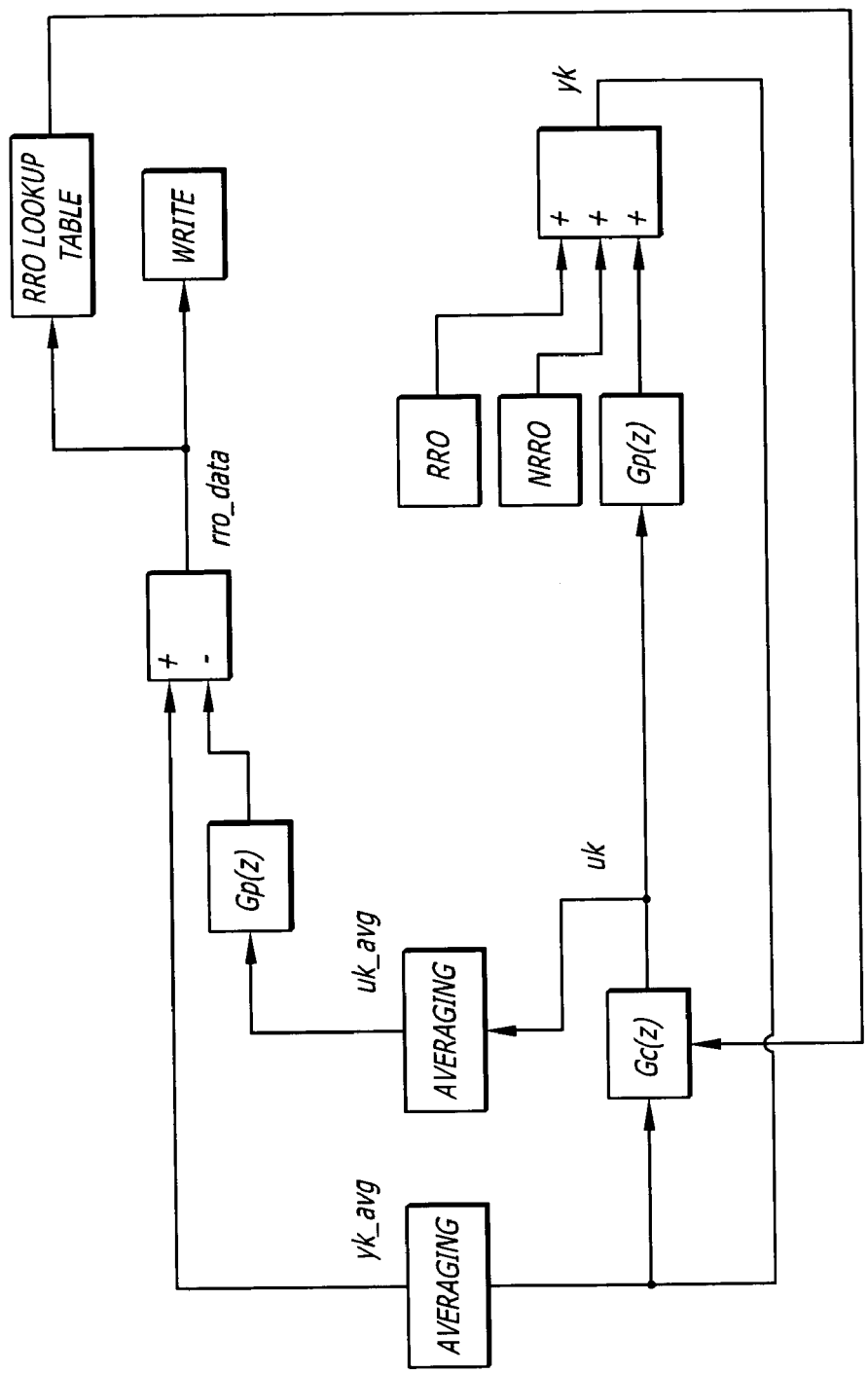
FIG. 11 is a diagram of a servo control loop.

Alternatively, the PES signals for repeatable runout RRO can be generated and corrected using the servo loop shown in FIG. 11 and described by the following equations;

$$rro_{(z)} = yk_{AVG}(z) - G_{(p)}uk_{AVG}(z) \quad (1)$$

where;

$G_{c(z)}$=the transfer function of the controller,
$G_{p(z)}$=the transfer function of the plant dynamics,
yk=the position error signal (PES),
rro=the repeatable runout on the disk,
nrro=the non-repeatable runout on the disk,
$rro_{(z)}$=the corrected RRO data.

The following equation can be used to iteratively update the RRO data:

$$rcd_{k+i}(i) = rcd_k(i) + \lambda * rro(i), \ 0 \leq i \leq \text{servo\_sector\_max} \quad (2)$$

where $\lambda$ (0, 1, 2 . . . ) is n update constant.

Figure 12:
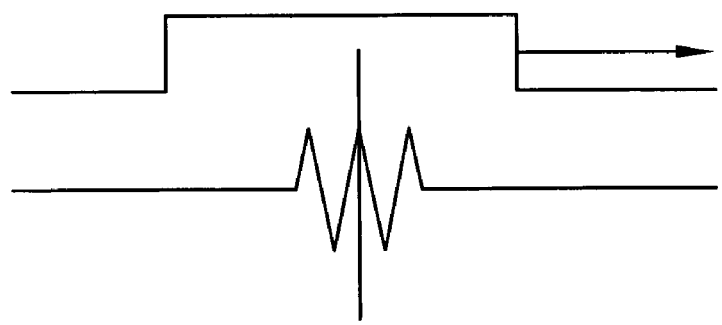
FIG. 12 is an illustration showing the adjustment of a timing window.

In block 106, the timing of the timing window or windows used for track 0 may be adjusted using the corrected PES/RRO data. By way of example, the timing windows may be adjusted to occur earlier or later in time than a default timing window. FIG. 12 shows an example of adjusting a timing window. A corrected PES can then be determined using the adjusted timing window in block 108.

In block 110, A, B, C and D servo bit patterns are written onto track 0 using the adjusted timing window(s) and corrected PES. After track 0 is completed, the process determines whether to move the head(s) to an adjacent track in decision block 112. In decision block 114, it is determined whether a different window(s) will be used to write track 1. If so, the process returns to block 104. If not, the process returns to block 110. This process is repeated until it is determined that the final track has been written with A, B, C and D servo bit patterns.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for writing servo information onto a disk of a hard disk drive, comprising:
    writing a plurality of spiral servo signals with a head, the spiral servo signals are used to write servo patterns using at least one timing window;
    generating a position error signal from the spiral servo signals;
    adjusting the timing window based on the position error signal; and,
    writing servo patterns with the adjusted timing window.

2. The method of claim 1, further comprising moving the head to an adjacent track and repeating the process of generating a position error signal, adjusting a timing window and writing servo patterns with the adjusted timing window.

3. The method of claim 1, wherein the position error signal is an average of a plurality of position error signals generated from the spiral servo signals.

4. The method of claim 1, wherein the position error signal is iteratively updated.

5. The method of claim 2, wherein a plurality of timing windows are used to write servo patterns and different timing windows have different adjustment values.

6. The method of claim 1, wherein the timing window is adjusted to insure the reading of a spiral servo signal.

7. The method of claim 1, wherein the timing window is adjusted relative to time.

8. A servo writer that writes servo information onto a disk of a hard disk drive, comprising:
    a controller that causes a writing of a plurality of spiral servo signals with a head, the spiral servo signals are used to write servo patterns using at least one timing window, generating a position error signal from the spiral servo signals, adjusting the timing window based on the position error signal, and writing servo patterns with the adjusted timing window.

9. The servo writer of claim 8, wherein said controller causes the head to move to an adjacent track and repeat the process of generating a position error signal, adjusting a timing window and writing servo patterns with the adjusted timing window.

10. The servo writer of claim 8, wherein the position error signal is an average of a plurality of position error signals generated from the spiral servo signals.

11. The servo writer of claim 8, wherein the position error signal is iteratively updated.

12. The servo writer of claim 9, wherein a plurality of timing windows are used to write servo patterns and different timing windows have different adjustment values.

13. The servo writer of claim 8, wherein the timing window is adjusted to insure the reading of a spiral servo signal.

14. The servo writer of claim 8, wherein the timing window is adjusted relative to time.

* * * * *